May 28, 1940. L. J. ANDRES Re. 21,462

REMOTE CONTROL DEVICE

Original Filed June 24, 1938 3 Sheets-Sheet 1

INVENTOR.

Lloyd J. Andres

May 28, 1940. L. J. ANDRES Re. 21,462

REMOTE CONTROL DEVICE

Original Filed June 24, 1938 3 Sheets-Sheet 2

INVENTOR.

Lloyd J. Andres

May 28, 1940. L. J. ANDRES Re. 21,462

REMOTE CONTROL DEVICE

Original Filed June 24, 1938 3 Sheets-Sheet 3

INVENTOR.

Lloyd J. Andres

Reissued May 28, 1940

Re. 21,462

UNITED STATES PATENT OFFICE 21,462

REMOTE CONTROL DEVICE

Lloyd J. Andres, Chicago, Ill.

Original No. 2,167,061, dated July 25, 1939, Serial No. 215,653, June 24, 1938. Application for reissue March 11, 1940, Serial No. 324,353

3 Claims. (Cl. 179—6.3)

This invention relates in general to remote control sound distribution devices and more particularly to a new and novel coin-operated control unit which provides means for selecting and reproducing any recorded sound rendition available in the automatic instrument to which it is connected.

Automatic selective phonographs have been commercially marketed for many years, and while these machines are highly efficient insofar as the mechanism is concerned, they all have a common sound distributing point, namely, the loud speaker in the cabinet.

Usually the automatic phonograph is used in public places where patrons are seated at a distance from the machine or even in separate rooms or booths, and the patron must therefore leave his position and walk to the machine in order to play it. This annoyance ofttimes greatly limits the plays of the phonograph. Moreover, the patron has no control over the volume emitted by the phonograph, and inasmuch as personal tastes differ greatly in this regard, quite frequently the volume is adjusted either too loud or too soft to suit all listeners.

Up to the time of this invention there was a widespread demand for the solution of this problem. The present invention overcomes these objections by providing an automatic selective phonograph of the type mentioned, with a plurality of isolated controllers adapted to select from the selective phonograph and deliver to the isolated point one or more of the sound renditions desired.

The combination of an automatic selective phonograph adapted and used with one or more selective remote control devices is not only selective as to musical renditions, but is multi selective as to the audience or distributing points. A patron at each distributing point can not only select, but after he has selected, can control his selection as to the volume which best suits his tastes.

A principal object of the invention provides for the use of a plurality of coin controlled remote control devices which may be placed at one or more sound isolated positions and wired to any selective type sound reproducer such as an automatic record changer equipped with a thermionic amplifier. Each remote controller is capable of reproducing one or more selected sound renditions as desired by the operator upon the deposit of the proper coin or coins.

Another object of the invention provides for the construction of a complete selective remote control device including loud speaker in one small compact casing adapted to be operated by the deposit of a coin and enabling an operator to select one or more sound reproductions upon the deposit of a proper coin or coins and have complete manual control over the volume of sound emitted.

A further object of the invention provides for a loud speaker and internal sound chamber designed to produce high quality reproduction within the confines of a minimum amount of space.

Another object of the invention provides for a system whereby one or more sound isolated speakers may be connected with a microphone or radio, thus providing means for sound distribution to the individual remote controllers without manual selection or coin operation.

A further object provides for a means to prevent the operator from obtaining more selections than those corresponding to the number of coins deposited.

Referring to the drawings.

Figure 1:
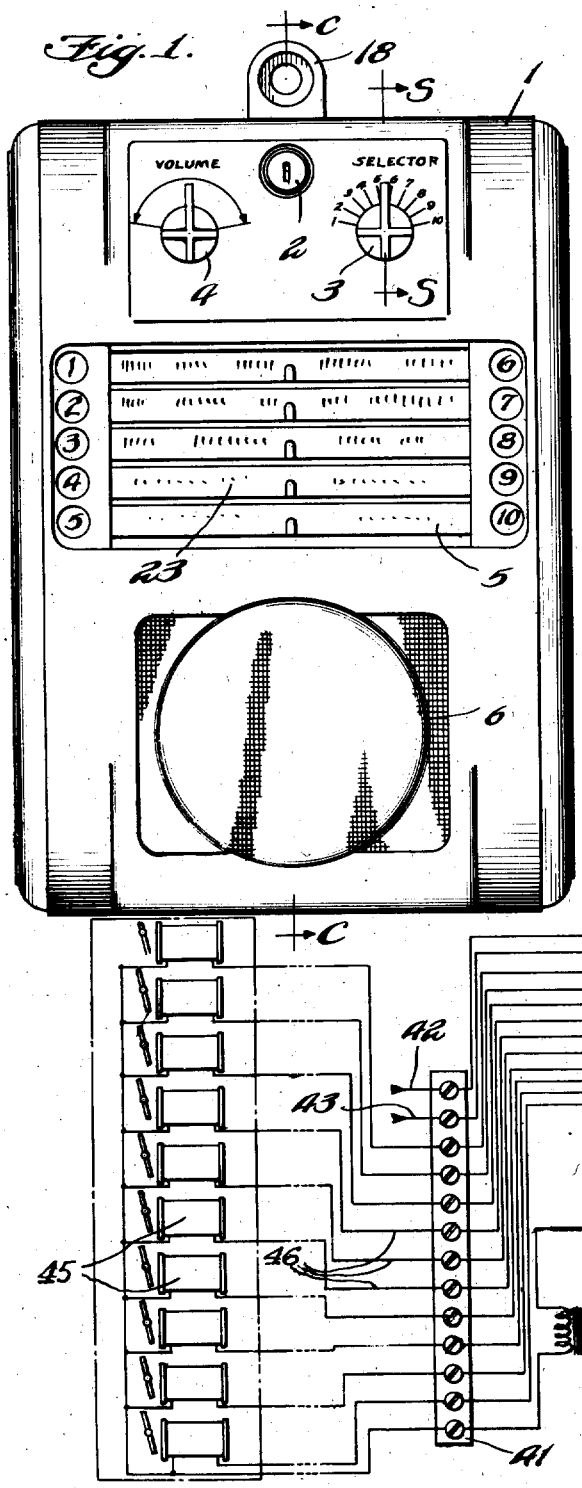
Fig. 1 is a front view of the device showing the coin receiver, volume and selector controls, program assembly and loud speaker grille.

Referring to Fig. 1, the front cover or casing 1, contains a cylinder lock 2, selector knob 3, volume control knob 4, an indirectly illuminated program plate assembly 5, and loud speaker grille 6.

Figure 4:
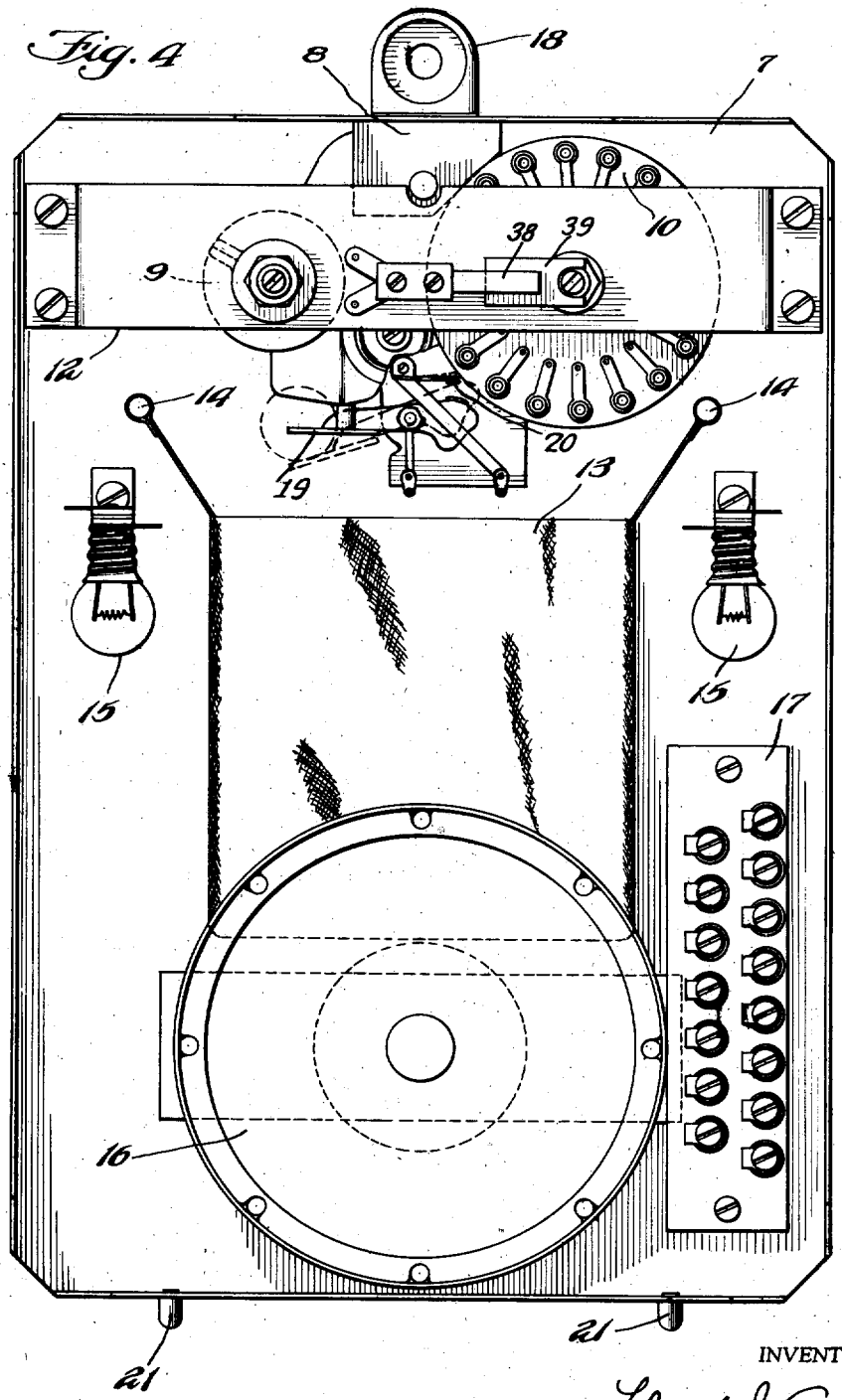
Fig. 4 shows the internal elements of the controller with cover removed.

The working parts are shown in Fig. 4 mounted on a back plate or rear casing 7. The combination coin receiver and slug detector 8 is mounted in the upper end thereof. Volume control 9, selector switch 10 and cut-out switch 38—39 are mounted to a suitable suspension bracket 12.

Figure 7:
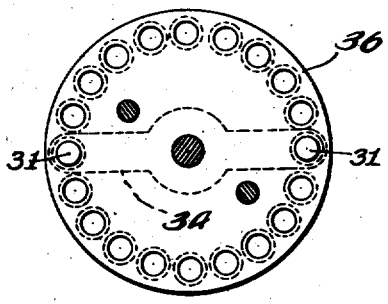
Fig. 7 is a plan view of the selector switch locking plate.

The shafts for the volume control 9 and the selector switch 10 are slotted so as to axially and rotationally engage with the shafts of the control knobs 3 and 4, shown in Fig. 1. Fig. 7 shows the method employed for engaging the knob shaft 32 with the selector switch shaft 30. The same construction is employed for engaging the volume control knob shaft with the shaft of the volume control 9. When the cover 1 is applied to the device, as shown in Fig. 4, the pin 31, Fig. 6, in each knob shaft engages with the corresponding slots in the selector and volume control shafts respectively.

A detachable fabric coin receiving bag 13 is suspended by two studs 14.

Lamps 15 are arranged to illuminate the printed program slips attached to the program plate assembly 5, Fig. 1.

Figure 5:
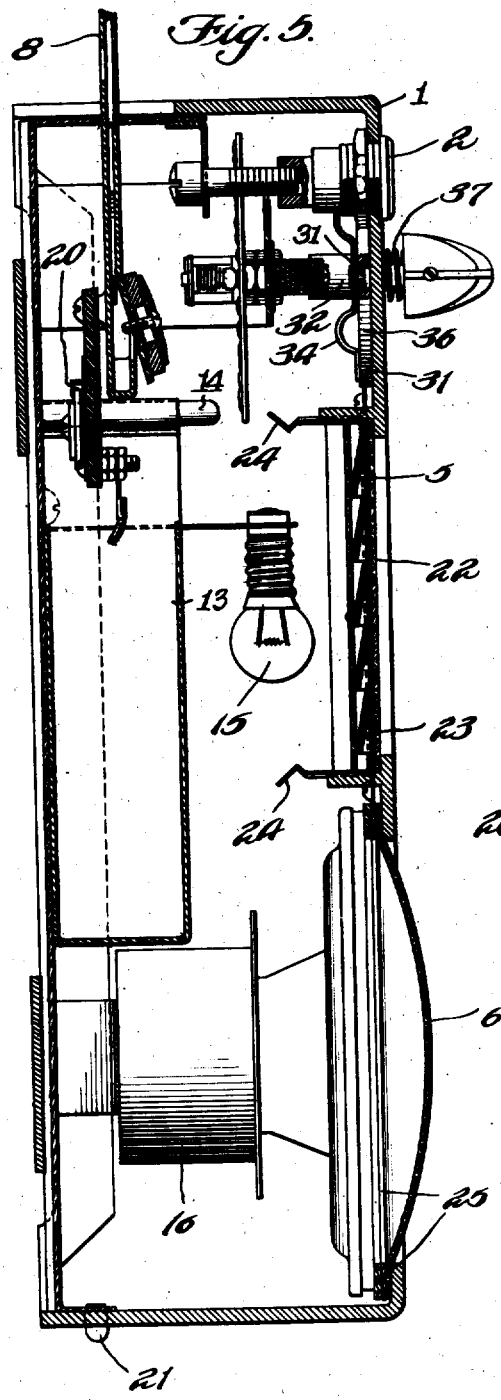
Fig. 5 is a cross-sectional view of the controller taken through section line *c—c*, Fig. 1.

The loud speaker 16, Figs. 4 and 5, is attached to the back plate in a position to correspond with the hole in the baffle of the cover 1. A terminal strip 17, Fig. 4, is provided as a junction to which are attached the control cable wires from the selective sound reproducer.

When a coin is deposited through the metering plate 18, it falls by the action of gravity through coin receiver 8 and impinges upon petal 19, which momentarily closes switch 20, Fig. 4. After closing the momentary switch 20 the coin falls into and is retained by bag 13.

Utilizing well known means, spurious coins are deflected and by-passed over petal 19 directly into the money bag 13, thus avoiding the closing of the momentary switch 20.

Referring to Fig. 5, the cover 1 is removed from the back plate 7 by unscrewing cylinder lock 2 which permits the cover to be drawn forward and downwardly releasing it from the dowel pins 21 which are anchored in the back plate, Figs. 1 and 5.

The program assembly 5, Fig. 5, is mounted behind glass window 22 and is slotted for the passage and diffusion of light. Thus the printed strips 23, which are attached to the inclined portions of the program plate, are illuminated by lamps 15.

Spring clips 24 are provided to retain the program plate assembly in its proper position and also provide means for quickly detaching the assembly to facilitate the changing of the printed program slips.

The loud speaker 16, Fig. 5, is shown positioned behind the circular baffle plate and air seal 25 directly to the rear of the wire cloth grille 6.

The volume control 9, shown in Fig. 4, is a conventional variable resistance L pad shown in the circuit diagram and its action will be hereinafter described.

Figure 6:
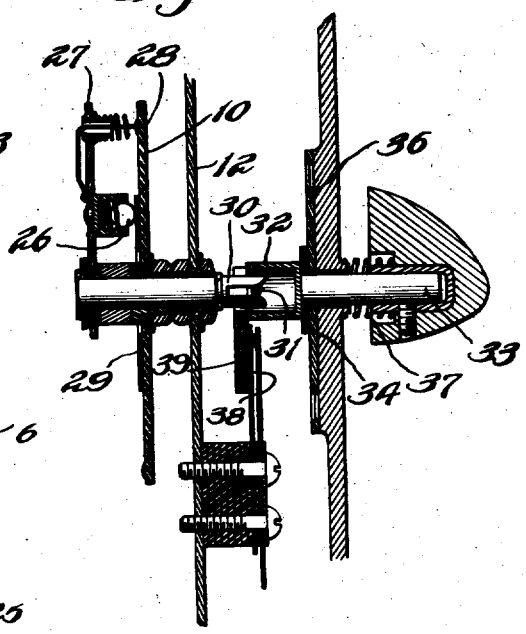
Fig. 6 is an enlarged cross-sectional view taken through the selector switch along line *s—s*, Fig. 1.

The selector switch 10, shown in section in Fig. 6, is an insulated multi-contact unit provided with a detent 26. The contact arm 27, which carried an ordinary brush member, is held into contact with any one of radial contacts 28 by the detent action of the ball 26 resting in radial depressions in a plate 29, which depressions correspond in number to the contacts 28. The slotted shaft 30 is shown in engagement with a pin which is integral with the collar 32 and the knob shaft 33.

Referring to Figs. 5 and 7, a locking arm 34 is provided to prevent normal rotation of the control knob. The arm 34 is integral with the knob shaft 33, shown in Fig. 6, and has studs 31 attached to the ends thereof for normal engagement with a fixed metering plate 36, shown in Figs. 5 and 7, which plate is affixed to the inside of the cover 1.

The spring 37 between the casing and the control knob, Figs. 5 and 6, normally urges the locking arm pins 31 into engagement with the holes in locking plate 36, thus normally preventing the rotation of the knob.

When the selector knob is pushed inwardly the locking arm 34 is disengaged from the plate 36 and rotation may be imparted to the selector switch. Simultaneously the breaker switch 38, Fig. 6, is opened through the action of collar 32 depressing the insulator which is attached to the inner switch spring 39.

In actual operation the operator chooses a selection from the program plate 5, Fig. 1, and then depresses the control knob 3 inwardly and turns the knob pointer 11 to a number, on the selector plate as shown, corresponding to the selection desired. While the knob is depressed, switch 38—39 is opened and the locking arm 34 of the selector switch is free to rotate. When the knob is released the locking arm 34 reengages plate 36 and prevents further rotation and simultaneously the switch 38 is closed.

A coin may then be deposited in the coin receiver plate 18 and the weight of the coin depresses petal 19 closing the contacts 20 momentarily which completes a circuit to the selective sound reproducer through breaker switch 38—39, switch contact arm 27 and a corresponding contact 28.

Since it is necessary to move the selector knob to disengage the locking arm 34 from the plate 36, which causes the switch 38—39 to open, an operator is prevented from obtaining more than one selection upon the deposit of a single nickel, which would be the case if the above means were not employed, as it is obvious an operator could deposit a coin and thus momentarily close the switch 20 and simultaneously rotate the selector switch and energize more than one external circuit.

When the selective sound reproducer starts its operation the sound output line of the reproducer furnishes the loud speaker 16 with the rendition selected. The volume of sound output from the loud speaker may be adjusted to suit the operator by means of the control knob 4 which rotates the L pad 9.

Figure 2:
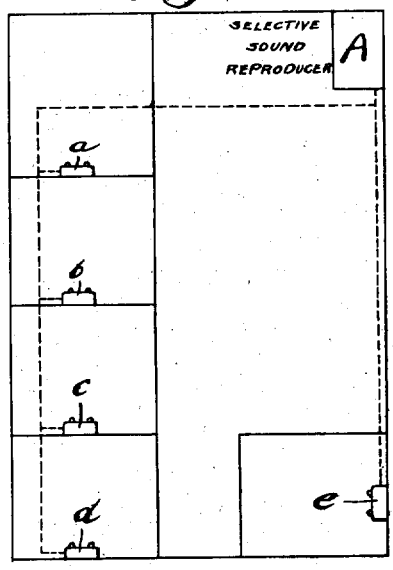
Fig. 2 shows a typical use of a plurality of the devices in sound isolated positions connected remotely to a selective sound reproducer.
Figure 3:
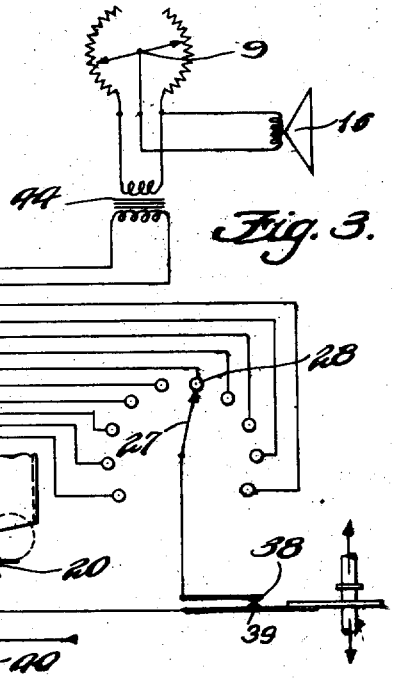
Fig. 3 shows the circuit diagram of the internal wiring of the remote controller and the connections with a solenoid operated selective sound reproducer.

Fig. 2 shows a diagrammatic lay-out of a typical installation with a selective sound reproducer at A and selective remote control devices in separate enclosures at *a*, *b*, *c*, *d*, and *e*. The dotted lines connecting the above devices to the sound reproducer represent multiple cables and are equivalent to the conductors 46 of Fig. 3. The wiring diagram, Fig. 3, shows the circuit employed in connecting one remote controller device to a selective sound reproducer. When more than one remote controller device is used at one isolated station the conductors are connected in parallel.

Alternating current power is supplied to the remote controller by transformer 40, one terminal of the secondary of which is connected to the common line 41 of the selective reproducer and the other terminal connected to one side of the momentary switch 20. The opposite side of the momentary switch is connected to the rotary arm 27 of the selector switch through manual breaker switch 38; thus when the selector knob is pushed inwardly the arm 27 can be moved to a desired contact 28, the breaker switch preventing the completion of the circuit, and by releasing the selector knob, a circuit may be established through the closed breaker switch and the momentary switch 20 by the deposit of a coin.

Since the selective reproducer A is presumed to be equipped with necessary electric reproducer and amplifier the sound output of the selective reproducer is connected to terminals 42 and 43 of each remote control device and run to an impedance matching transformer 44, the secondary of which is connected to the voice coil of the loud speaker through the volume control L pad 9.

Referring to the schematic wiring diagram, Fig. 3, an operator, by pushing the control knob inwardly, as previously described, may rotate the selector switch arm 27 until it rests upon the contact selected, in this case indicated by numeral 28. It will be observed that while the operator is rotating the switch arm 27 he has necessarily moved the control knob inwardly, which opens the switch 38—39. Upon releasing the control knob the switch 38—39 is closed by the action of a spring previously described.

Then, upon the deposit of an appropriate coin in the coin receiver, the switch 20 is momentarily closed, which completes a circuit as follows: From one side of the secondary of the power supply transformer 46, through the momentary switch 20, through the breaker switch 38—39, through the switch arm 27 and selected contact 28, from contact 28 through a conductor to a corresponding electro-magnet 45 in the selective sound reproducer, through conductor 46.

Since one side of all the magnets 45 in the sound reproducer are common, the circuit is completed through a conductor to terminal 41 and return to the remaining side of the secondary of the power transformer.

Conductors 42 and 43 are connected to the sound output of the selective sound reproducer and are carried by a pair of conductors to audio transformer 44 L pad volume control 9 to loud speaker 16. Thus, upon the tripping of a selected magnet 45 reproduction corresponding to this magnet will be delivered to the loud speaker 16 in the device.

Having described my invention, I claim:

1. A coin controlled reproducer system for selectively playing and selectively delivering at remote stations a selected record from a repertoire comprising, in combination, a reproducer and selective record changer, a plurality of individual isolated coin controlled selective sound distributors and controllers adapted to initiate the selection of any of said records, circuits to electrically deliver, isolate, and control said rendition at the place of said isolated initiation, said isolated sound distributor and controller comprising a selector means, a coin controlled initiating mechanism, a loud speaker, a circuit network connecting said isolated selective distributors and controllers with the responsive circuits of said reproducer and record changer and a series circuit in the coin controlled selective distributor connecting the said selector means and the coin operated mechanism.

2. A coin controlled reproducer system for selectively playing and selectively delivering at remote stations a selected record from a repertoire comprising in combination, a reproducer and selective record changer, a plurality of individual isolated coin controlled selective sound distributors and controllers adapted to initiate the selection of any of said records, circuits to electrically deliver, isolate, and control said rendition at the place of said isolated initiation, said isolated sound distributor and controller comprising a selector means, a coin controlled initiating mechanism, a loud speaker, a circuit network connecting said isolated selective distributors and controllers with the responsive circuits of said reproducer and record changer, and a series circuit in the coin controlled selective distributor connecting the said selector means and the coin operated mechanism, and means for locking selector means against selecting more than one rendition upon the disposes of one coin.

3. A coin controlled reproducer system adapted for selectively playing and selectively delivering at remote stations a desired reproduction from a repertoire of records comprising in combination, a reproducing station, a circuit network through which the desired record is registered at the reproducing station, a plurality of individual isolated coin controlled distributors adapted to initiate the circuit network through which the desired record is registered at the station, a sound transmission circuit to electrically deliver and isolate said rendition at the place of said isolated initiation, said isolated sound distributor comprising a coin controlled initiating mechanism, a loud speaker, and an additional circuit in the coin controlled distributor connecting the said coin controlled initiating mechanism with the said reproducer station.

LLOYD J. ANDRES.